May 10, 1932.  C. VELLINO  1,857,896
CHAIN PUMP
Filed April 25, 1929
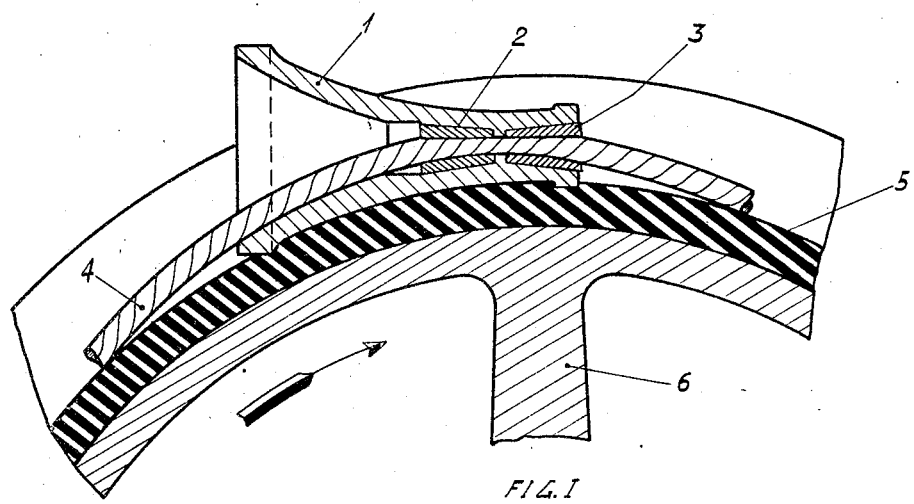
FIG. I
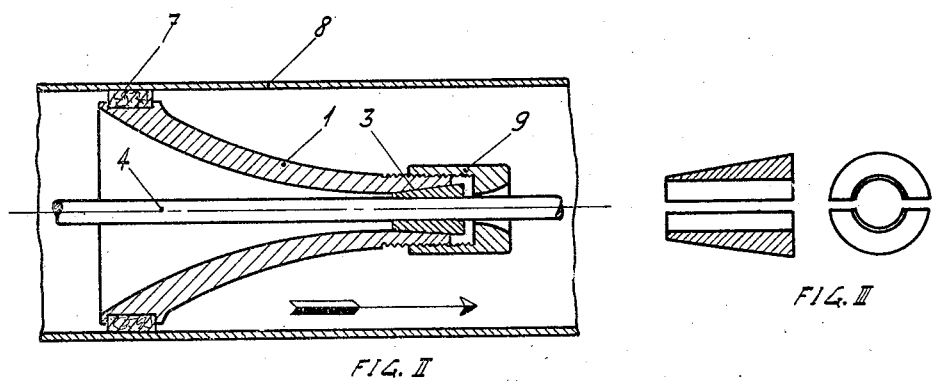
FIG. II
FIG. III
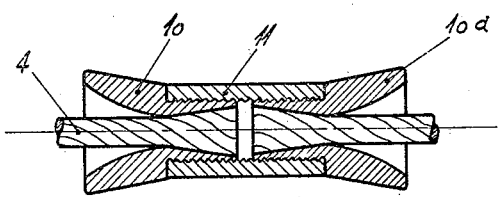
FIG. IV
INVENTOR
C. Vellino,
BY Langner, Parry, Card Langner
ATTYS.

Patented May 10, 1932

1,857,896

UNITED STATES PATENT OFFICE

CARLOS VELLINO, OF BARCELONA, SPAIN

CHAIN PUMP

Application filed April 25, 1929, Serial No. 358,113, and in Spain April 25, 1928.

This invention relates to chain pumps and a particular object thereof is to eliminate the shocks upon the cable which are caused by the pistons carried by the cable when passing over the pulley. In the usual devices of this type the cable is forced from the periphery of the pulley approximately a distance equal to one-half of the diameter of the piston and this invention is intended to eliminate such a disadvantage.

It is a further object of the invention to devise a construction whereby the diameter of the pistons can be greatly increased without the usual disadvantage of thereby forcing the cable to traverse a path a great distance beyond the periphery of the pulley.

It is also an object of the invention to provide a construction which will eliminate slips of the cable through loss of adherence while traversing the pulley.

It is also designed to provide a construction which will eliminate the necessity of employing rubber pistons and which will greatly increase the life of the pistons and the cable or chain.

Experiments have been made to obviate the impacts caused by the piston raising the cable above the periphery of the pulley by making certain hollows or grooves in the circumference of the pulley or drum to accommodate the various pistons and it is an object of this invention to eliminate such constructions with their consequent disadvantages.

The specific purpose of my invention resides in constructing the piston in the shape of a bell or trumpet in which the curve of the outside of the piston will fit the curve of the pulley or drum and will separate out in the rising pipe so as to substantially fill the interior diameter of such pipe. Due to the construction involved the cable will pass over the pulley in close proximity to the periphery of the pulley and is only spaced therefrom by the thickness of the wall of the piston and thereby all strain and snapping of the cable is materially reduced thereby prolonging the life of the cable.

With these and other objects in view which will become apparent as the description proceeds, my invention is shown in the accompanying drawings and described in detail below.

In the drawings,

Figure 1 shows a sectional view of a part of a drum or pulley over which a piston is passing, Figure 2 is a partial longitudinal section of the rising pipe with a piston therein, Figure 3 illustrates a sectional and elevational view of a type of divided conical sleeve for fixing the piston onto the cable, and Figure 4 is a section of a joint joining the ends of the cable with a double piston.

Referring to the drawings, the piston is indicated at 1 and it is designed to rise in the piping 8 and upon its return movement will pass around the periphery of the drum 6 in the direction indicated by the arrow in Figures 1 and 2. As the cable rises the narrow part of the piston 1 will first present its narrow portion against the periphery of the drum 6 and since the cable 4 rests upon the inside wall of the piston, there will be caused a tilting of the piston in the manner shown in Figure 1 and the engagement of the piston with the pulley is cushioned through means of the rubber cushion 5 upon the circumference of the drum 6.

It is of course obvious that by lengthening the piston 1 the diameter of this piston which is adapted to cooperate with the side walls of the pipe 8 can be considerably increased without thereby causing the cable 4 to be moved further from the periphery of the drum 6.

The piston is secured to the cable in a novel manner which will now be described.

This attachment is made by means of conical sleeves or boxes which can be cast preferably upon the cable itself and the sleeves consist preferably of a lead alloy. The sleeve 2 is preferably in two parts, as shown in Figure 3 and this is first fitted upon the cable at the desired position. The piston is then forced upon the sleeve 2 so as to maintain the sleeve 2 and the piston in sufficient adherence so as to withstand the strains to which the piston is subjected in the operation of the pump. Therefore there is cast directly upon the cable 4 the sleeve 3 which can be strongly urged into position by means of a hammer or a press to thereby fix the piston in position upon the cable permanently.

From the construction above described it is to be noted that a strain upon the piston 1 will automatically tighten the connection between the piston 1 and the sleeve 2 and will prevent any slipping relative to the cable and the piston.

In Figure 2 a modification of the connection between the piston 1 and the cable 4 is shown and this modification consists in providing a sleeve 3 of the form previously described and providing the external diameter of the piston at its smaller end with screw threads which will cooperate with the cap or outer sleeve 9. The cap 9 is provided with an aperture to accommodate the cable 4 and this aperture is of cone-shape so as to allow the cable and the piston to vary their positions relative to one another to permit the piston to occupy the position shown in Figure 1 when passing over a pulley. Due to the construction described, it will be noted that the outer curve of the piston itself is such that it will adapt itself readily to the curvature of the pulley and at the same time the inside curvature of the piston is such that wear and tear of the cable upon the inside surface is greatly minimized.

Preferably the pistons 1 are made of cast iron but of course they can be made of any other desired or suitable metal.

Although the above described improvement is adapted to be used more especially upon chain pumps with a high lineal speed, thereby permitting the use of pistons wherein there is a slight play between the external periphery of the pistons and the wall of the pipe, it can nevertheless be used as shown in Figure 2 in which the piston is provided with a packing 7 which can be of hemp, leather or any other suitable material. It is of course obvious that these improvements can be utilized in chain pumps which are actuated by horse or in wind-mills whose action is exceedingly irregular.

In Figure 4 a method is shown whereby the cable ends may be spliced advantageously so as to preserve the objects of this invention. The ends of the cable 4 are thickened and are secured to the pistons 10 and 10a by means of a zinc or lead alloy and then the two pistons are joined by means of a threaded sleeve 11 cooperating with screw threads upon the pistons 10 and 10a. In this manner a very secure joint is secured between the cable ends which will allow the cable to pass over the pulley periphery in the same manner as the pistons above described without increasing the impact and the flexing of the cable itself.

It is obvious that various modifications and improvements may be devised in the constructions above set forth, but it is my intention to include all such modifications and improvements as will fall within the spirit and scope of the following claims.

I claim:—

1. In a chain pump, a cable carrying a series of pistons, a driving pulley for said cable, said pistons having a hollow trumpet shape whose outline has substantially the same curvature as the peripheral curvature of said driving pulley, so that the pistons when passing over the pulley may adapt themselves substantially to the rim of the pulley thus avoiding any undue stress on the cable.

2. In a chain pump, a cable, a series of pistons secured to said cable in spaced relation, a driving pulley for said cable and pistons, said pistons having a hollow trumpet shape and being secured to the cable at its narrow end, the outline of the outer and inner surfaces of said pistons having substantially the same curvature as the periphery of said driving pulley, in order that when passing the pistons over the pulley the outer surface of the pistons adapts itself substantially to the rim of the pulley and the cable remains separated from the rim of the pulley only by the thickness of the wall of the trumpet-shaped piston.

3. In a chain pump, a cable carrying in spaced relation a series of pistons of hollow trumpet shape, a driving pulley over which said cable and pistons pass, said pistons being secured to the cable at its end of smaller diameter, and the outer and inner surfaces of said pistons having substantially the same curvature as the periphery of said driving pulley, in order that the pistons when passing over the pulley may adapt themselves substantially through their whole length to the periphery of the pulley and the cable while the part corresponding to the piston remains separated from the rim of the pulley only by the thickness of the wall of the trumpet-shaped piston.

4. In a chain pump, a cable, a series of pistons secured to said cable in spaced relation, a driving pulley over which said cable and pistons pass, said pistons having a hollow trumpet shape and being secured to the cable at its narrow end, the curvature of the outer and inner surfaces of said pistons being substantially the same as the peripheral curvature of said driving pulley, in order that when passing the pistons over the pulley the outer surface of the pistons adapts itself substantially to the rim of the pulley and the cable while the part corresponding to each piston remains separated from the rim of the pulley only by the thickness of the wall of the trumpet-shaped piston.

In testimony whereof I affix my signature.

CARLOS VELLINO.